(12) United States Patent
Lin et al.

(10) Patent No.: US 11,777,171 B2
(45) Date of Patent: Oct. 3, 2023

(54) BUCKLING STRUCTURE FOR A BATTERY OF A HANDHELD POWER TOOL

(71) Applicant: Yu-Tang Lin, New Taipei (TW)

(72) Inventors: Yu-Tang Lin, New Taipei (TW); Hsien-Yu Kao, New Taipei (TW)

(73) Assignee: Yu-Tang Lin, New Taipei (TW)

( * ) Notice: Subject to any disclaimer, the term of this patent is extended or adjusted under 35 U.S.C. 154(b) by 99 days.

(21) Appl. No.: 17/377,137

(22) Filed: Jul. 15, 2021

(65) Prior Publication Data

US 2021/0344077 A1 Nov. 4, 2021

Related U.S. Application Data

(63) Continuation-in-part of application No. 16/405,598, filed on May 7, 2019, now abandoned.

(30) Foreign Application Priority Data

Jan. 22, 2019 (TW) .................................. 108201033

(51) Int. Cl.
*H01M 50/264* (2021.01)
*H01M 50/247* (2021.01)
*B25F 5/02* (2006.01)

(52) U.S. Cl.
CPC ............. *H01M 50/264* (2021.01); *B25F 5/02* (2013.01); *H01M 50/247* (2021.01); *H01M 2220/30* (2013.01)

(58) Field of Classification Search
CPC ...... H01R 31/06; H01M 10/425; H01M 2/20; H01M 2220/30; H01M 2010/4271; H01M 2/30; B25F 5/02; B25B 21/00; Y02E 60/10

See application file for complete search history.

(56) References Cited

U.S. PATENT DOCUMENTS

| 8,940,427 | B2 | 1/2015 | Noda et al. | |
| 2006/0164032 | A1 | 7/2006 | Johnson et al. | |
| 2009/0246608 | A1* | 10/2009 | Wu | H01M 50/20 |
| | | | | 361/747 |
| 2010/0000067 | A1* | 1/2010 | Turner | H01M 50/204 |
| | | | | 429/97 |
| 2013/0136956 | A1 | 5/2013 | Nakano et al. | |
| 2015/0249237 | A1 | 9/2015 | Naito | |
| 2018/0108884 | A1 | 4/2018 | Chen | |
| 2020/0235594 | A1 | 7/2020 | Lin et al. | |

* cited by examiner

*Primary Examiner* — Ula C Ruddock
*Assistant Examiner* — Sarika Gupta
(74) *Attorney, Agent, or Firm* — RABIN & BERDO, P.C.

(57) ABSTRACT

A buckling structure for a battery of a handheld power tool includes a horizontal opening end formed at a handheld seat of the power tool, a buckling structure arranged on top of a battery base and configured to mutually guide, insert and buckle into the opening end to be integrally attached thereto, the buckling structure comprising: a guiding slot formed at a front side surface of the battery base, two receiving slots formed at two sides of the guiding slot respectively, a pressing member arranged inside the guiding slot and two buckling members arranged inside the receiving slot respectively, and an elastic element connected to the pressing member and each of the buckling members respectively, thereby achieving an assembly and buckling structure having single direction movement and stable, durable structure that is convenient to use and operation.

9 Claims, 12 Drawing Sheets

BUCKLING STRUCTURE FOR A BATTERY OF A HANDHELD POWER TOOL

BACKGROUND OF THE INVENTION

1. Technical Field

The present invention relates to a tool, especially to a handheld power tool.

2. Description of Related Technology

A handheld power tool makes assembling or disassembling of objects easier and more effective. The handheld power tool uses a battery as a power source and is combined with a conventional hand tool such as a screwdriver or a drill so that people can use a handheld power instead of driving the hand tools manually.

The abovementioned handheld power tool has a driving assembly, a handheld seat, and a battery. The handheld seat has a protruding rib and the battery has a groove. The groove and the protruding rib are engaged with each other. The battery is detachably mounted on a bottom end of the handheld seat as a power source to drive the driving assembly which is mounted on a top end of the handheld seat. Thus, by mounting a hand tool such as a screwdriver or a drill on the driving assembly, a user is able to drive the hand tool by electricity instead of by manual force.

The abovementioned battery has a buckling component formed on a top surface thereof. The buckling component buckles the battery and the handheld seat as the protruding rib of the handheld seat reaches a front end of the groove after moving along the groove in order to prevent the battery and the handheld seat from detaching from each other. The buckling component is abutted by a spring inside the battery and protrudes from the top surface of the battery. When detaching the battery and the handheld seat, the user has to press a pressing segment of the buckling component to press the spring in order to make the buckling component retract into the top surface of the battery and unbuckle the battery and the handheld seat.

However, because of the abovementioned structure, by pressing the buckling component, the user is simultaneously pressing the spring directly downwards. Moreover, the manufacturer usually uses a spring with high elasticity to make sure the handheld seat and the battery are combined stably. So, detaching the handheld seat and the battery becomes a laborious task for the user. Besides, a direction of a force that presses the buckling component is perpendicular to a direction of a force that is exerted to detach the battery and the handheld seat. Thus, pressing the buckling component generates unnecessary friction between the groove and the protruding rib and makes the detaching progress more difficult.

U.S. Patent Publication No. 20180108884 discloses a battery pack, using the engagement portions of the positioning member for inserting into the locating slots of the push button, thereby allowing the push button and the positioning member to move relative to each other (movement of the push button and rotation of the positioning member). However, such structure is found to have numerous drawbacks in actual practice. For example, the locking slots at two sides are overly long such that long distance of sliding is required during the installation and detachment of the battery pack. Consequently, its operation cannot be performed easily and wear or deformation is prone to occur, such that the product useful life is affected. Since the front and rear sides of the top end of the positioning blocks of the positioning member have downward slanted surfaces, the issue of disengagement of buckling is likely to occur. To overcome such drawback, it is necessary to use a high-strength restoring spring (i.e., it is necessary to apply a great acting force to compress the spring as mentioned above). Consequently, it can cause difficulty during the pressing of the push button. Furthermore, for the structure disclosed in said patent publication, both installation and detachment of the battery pack can cause movements of its internal components, such that its engagement portions and locating slots are required to withstand high-strength acting force due to the two-way movement (caused by the restoring spring). As a result, its components are prone to breakage and defectiveness, and the product durability is reduced.

In addition, according to the battery pack disclosed in the U.S. Patent Publication No. 20060164032, it merely uses the locking member to engage with the buckling structure. Through the user's pressing or use of the biasing member (such as a spring leaf), the locking member is restored. However, since such type of structure merely uses the locking member for connection and securement, the vibration, wobbling or collision during the use of the device can cause looseness of the locking member, leading to disengagement and falling-off of the battery pack.

To overcome the shortcomings, the present invention provides a bucking structure for a battery of a handheld power tool capable of mitigating or obviating the aforementioned problems.

BRIEF SUMMARY OF THE INVENTION

A primary objective of the present invention is to provide a buckling structure for a battery of a power tool, capable of using first and second elastic elements acting on a buckling member and a pressing member respectively, and a mechanism of the pressing member driving the buckling member in single direction, such that during the user's assembly process, the buckling member is able to elastically move and buckle properly without driving the pressing member to move. In addition, during the detachment and disengagement, the pressing member is able to drive the buckling member to disengage from the buckled state without the use of any high-strength elastic elements, such that it is able to increase the convenience of use during operation and the overall structural stability and durability.

To achieve the abovementioned effects and objective, the present invention provides a buckling structure for a battery of a handheld power tool, having a horizontal opening end (18) formed on a handheld seat (13) of the power tool (11), and a buckling structure arranged on top of a battery base (20) and configured to mutually guide, insert and buckle into the opening end (18) to be integrally attached thereto, and the main technical means adopted include: a receiving surface (15) formed at an inner side of the opening end (18) and configured to move forward and backward relative to a buckling surface (24) of the battery base (20), and the receiving surface (15) having a buckling groove (151) formed thereon; a guiding slot (221) formed at a front surface of the battery base (20); the guiding slot (221) extending horizontally, and having at least one guiding protrusion (223) and a leading slot (224) formed at two side slot surfaces respectively, at least one first base hole (222) formed at a center of a bottom slot surface and a limiting slot (225) and a horizontal protrusion (226) extended at a rear end; two receiving slots (241) formed at the buckling surface (24) respectively; the two receiving slots (241) disposed at two sides of the guiling slot (221) respectively and fluidly connected to the guiding slot (221); each one of the receiving slots (241) extending vertically and having a second base hole (242) formed thereon; two buckling members (25) and two second elastic elements (28); the two buckling members (25) disposed inside the two receiving slots (241) respectively and configured to move vertically between an upper position and a lower position along the two receiving slots (241); each one of the two elastic elements (28) arranged between each one of the second base holes (242) and each one of the buckling members (25) and configured to provide an upward elastic acting force to each one of the buckling members (25); each one of the buckling members (25) having a slab (252) extended from one side thereof and configured to insert into the guiding slot (221); the slab (252) having a slanted abutment surface (253); a pressing member (26) and a first elastic element (27); the pressing member (26) disposed inside the guiding slot (221) and configured to move between a front position and a rear position along the guiding slot (221); the first elastic element (27) arranged between the first base hole (222) and the pressing member (26) and configured to provide a forward elastic acting force to the pressing member (26); the pressing member (26) having a pair of guiding blocks (263) arranged corresponding to the leading slot (224) respectively, a pressing surface (261) arranged opposite from the two abutment surfaces (253), and an extension plate (264) formed at a rear end and configured to insert into the limiting slot (225), and a latching portion (262) arranged at a rear end of the extension plate (264) and configured to be retained by the guiding protrusion (223); wherein when the battery base (20) is buckled to the handheld seat (13), the buckling member (25) is at the upper position and capable of being inserted into the buckling slot (151) of the receiving surface (15) in order to restrict the battery base (20) from moving relative to the handheld seat (13); when the buckling member (25) is at the lower position, it is disengaged from the buckling slot (151), thereby allowing the battery base (20) to move relative to the handheld seat (13); when the pressing member (26) is moved toward the rear position, the pressing surface (261) pushes against the abutment surface (253) in order to drive the buckling member (25) to move toward the lower position.

According to the abovementioned structure, each one of the buckling members (25) further comprises a protrusion (251) configured to protrude out of the buckling surface (24) when the buckling member (25) is at the upper position or to insert into the buckling slot (151) during buckling and attachment.

In a preferred embodiment, the protrusion (251) of each one of the buckling members (25) is configured to protrude out of the buckling surface when the buckling member is at the upper position or to insert into the buckling slot during buckling and attachment. A front side height of the protrusion (251) is higher than a rear side height thereof, and when it is at the upper position, the rear side height is approximately close to the height of the buckling surface, thereby allowing the handheld seat to push the protrusion (251) to move downward from the rear end having a lower height when it slides forward relative to the battery base during the assembly and attachment thereof. Consequently, it is able to easily slide to the position of the buckling slot corresponding to the protrusion (251), such that the second elastic element is able to act on the buckling member to allow the protrusion (251) to insert into the buckling slot, and its higher front side is able to buckle into the buckling slot. In addition, the abutment surface (253) of each one of the buckling members (25) is a slanted surface having a lower front side and a higher rear side. Furthermore, the pressing surface (261) of the pressing member (26), similarly, can be parallel with the slanted surface of the abutment surface (253).

Furthermore, the battery structure of a power tool of the present invention further comprises locking structures respectively formed at two lateral sides of the battery base in order to achieve greater strength and impact resistance capability during the assembly and attachment, thereby increasing the overall durability.

The handheld seat of the power tool comprises two lateral protruding walls extended downward and configured to allow the two lateral sides of the base seat to be detachably attached thereto, thereby allowing the battery base to slide forward and backward relative to the handheld seat. In addition, the buckling surface of the battery base is configured to slide forward and backward along with the battery base and relative to the handheld seat. The two lateral sides of the battery base include a front locking slot extending horizontally and configured to allow a front locking pin of each one of the lateral protruding walls to slide along each one of the front locking slots and to be detachably locked thereto when the two lateral protruding walls are attached to the two lateral sides of the battery base. Moreover, each one of the front locking slots includes a rear locking slot formed at a rear thereof. In other words, each one of the front locking slots and each one of the rear locking slots are disposed locations adjacent to the front end and the rear end of the lateral side of the battery base respectively. Accordingly, a rear locking pin of each one of the lateral protruding walls is able to slide along with each one of the rear locking slot and to be detachably locked thereto.

With the aforementioned structure, the opening ends of each one of the front and rear locking slots are formed at the rear end, and each one of the front locking slots further includes vertically extended moving slot connected to a rear end thereof. When the handheld seat is attached to the battery base, each one of the front locking pins is able to slide downward along each one of the moving slots respectively, following which each one of the front and rear locking pins then slide toward along each one of the front and rear locking slots respectively in order to achieve the locking thereof.

Accordingly, the locking slots and locking pins arranged at the front and rear locations can be utilized in order to achieve a structure having stress evenly distributed at four corners after the assembly and attachment, which also makes the attachment of the component parts to be more stable. In addition, through the operational model of shorting the horizontal sliding path, it is able to increase the use convenience during assembly and detachment of the components.

In a preferred embodiment, each one of the front locking pins can further include a press-fit protruding portion formed to protrude at a rear end and configured to press-fit into each one of the front locking slots. Furthermore, each one of the rear locking pins can also include a press-fit protruding portion formed to protrude out of the rear end and configured to press-fit into each one of the rear locking slots. Consequently, during the assembly and attachment of the battery base onto the handheld seat, the relatively loose front ends of the locking pins can be used to slide into the locking slots, followed by allowing the press-fit protruding portions to slide into the locking lots in order to form press-fit attachment, thereby achieving the effects of convenient operation and stable locking. Moreover, each one of the front locking pins and each one of the rear locking pins can include an air guiding slot formed to fluidly connect the front end and the rear end thereof respectively, such that it is able to facilitate the air guidance during the assembly and attachment and to reduce the air resistance formed inside the locking slot during the operation.

In addition, the buckling surface horizontally extends to the top of the battery base, and the receiving surface is generally parallel with the buckling surface. Furthermore, when the two lateral protruding walls are attached to the two lateral sides of the battery base, the buckling surface is able to abut against the receiving surface and to slide forward and backward relative to the receiving surface.

The following discloses preferred embodiments of the present invention along with the accompanied drawings in order to further explain the technical means adopted by the present invention in order to achieve the predefined objectives of the present invention.

DETAILED DESCRIPTION OF THE INVENTION

As shown in FIG. 1 to FIG. 7, the present invention manly relates to the structural improvement of a power tool assembly 10 and a battery base 20, such that the power tool assembly 10 and the battery base 20 can be facilitated for operation and more labor saving during the assembly and attachment process. In addition, with a stable buckling structure capable of distributing stress, the structure after the assembly and attachment process can be more stable. Accordingly, the present invention mainly comprises a power tool assembly 10 and a base seat 20.

Figure 1:
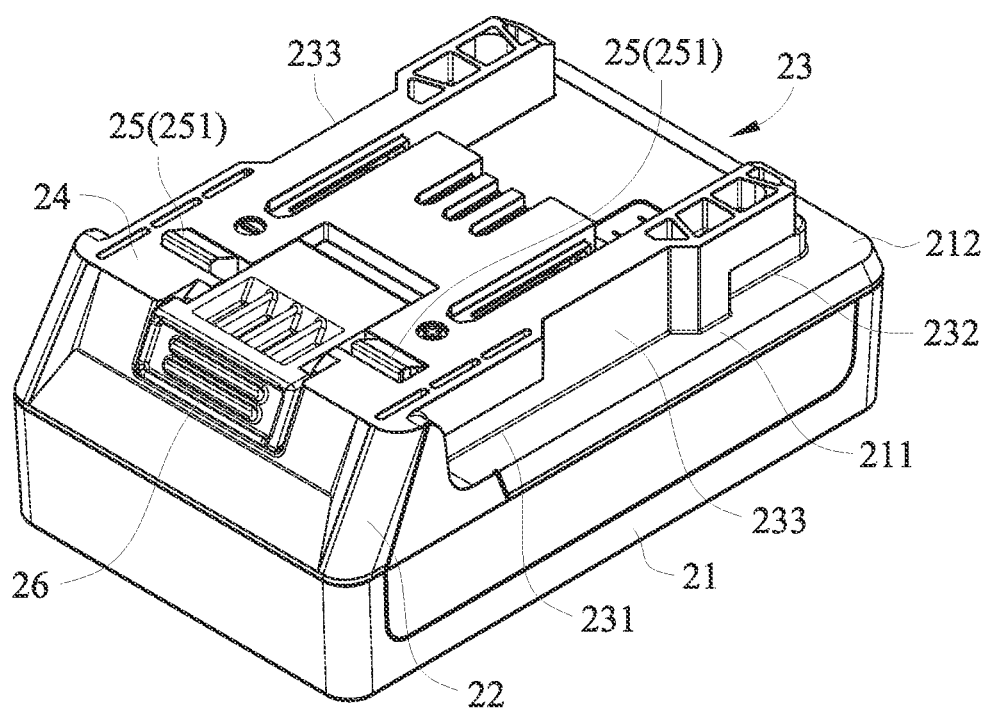
FIG. 1 is a perspective view of the battery base of the present invention.
Figure 2:
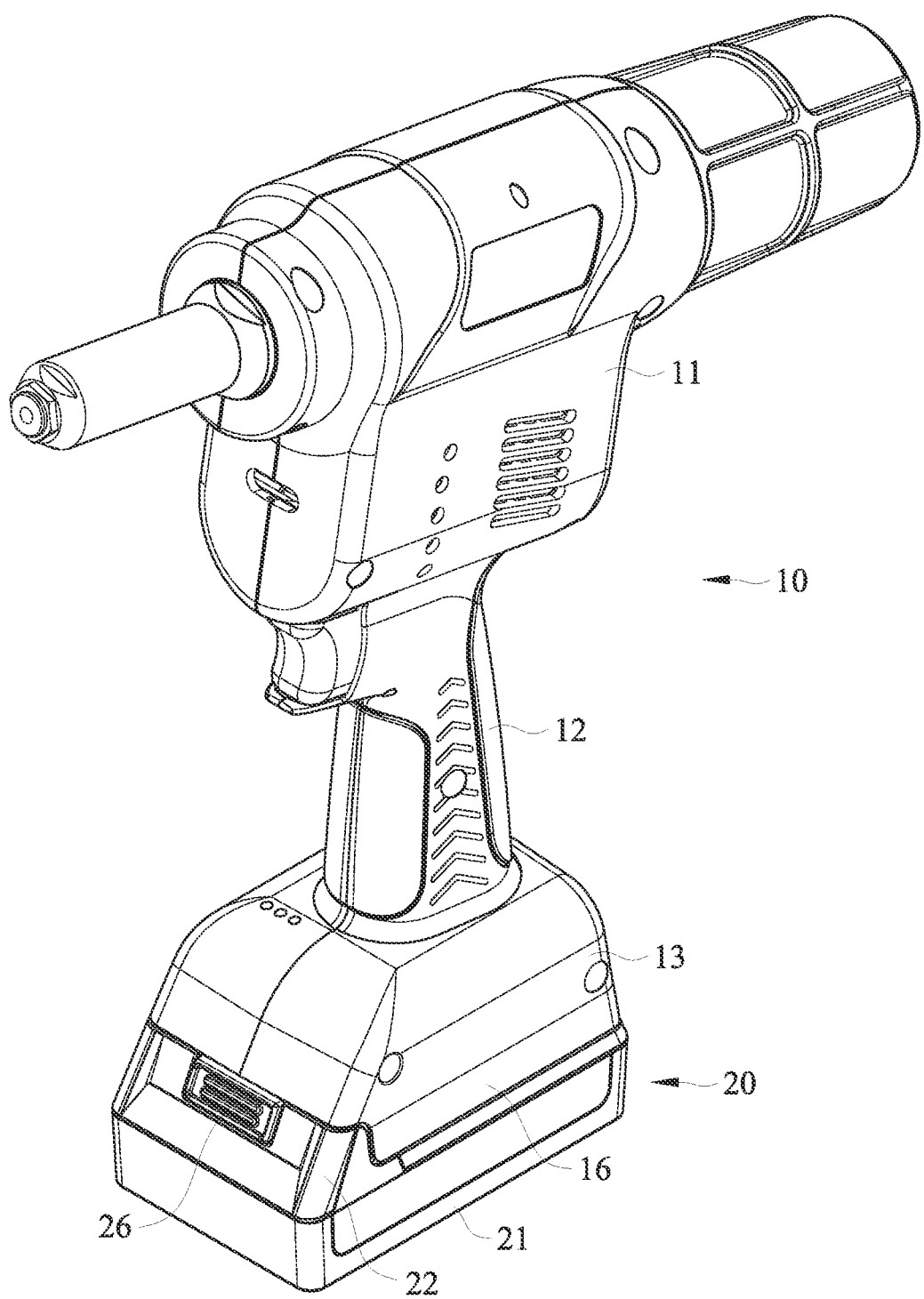
FIG. 2 is a perspective view showing an overall attachment state of the battery base with the power tool of the present invention.
Figure 3:
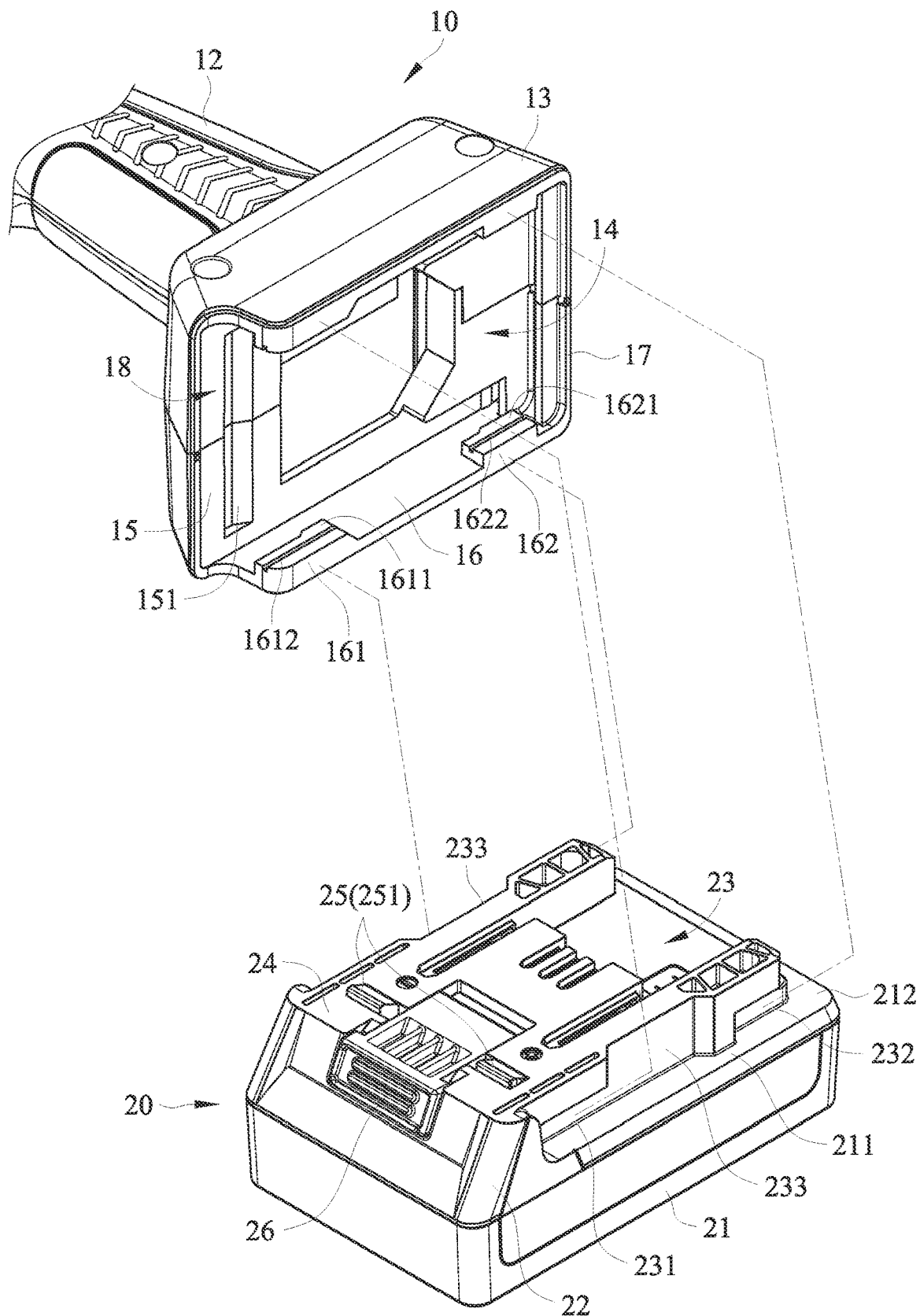
FIG. 3 is a detached view of the battery base of the present invention detached from the handheld seat of the power tool.

The power tool assembly 10 mainly comprises a power tool 11, a handle 12 and a handheld seat 13 arranged at the top, middle and bottom sections thereof, as shown in FIG. 1 to FIG. 3. The top end of the handle 12 is connected to the power tool 11, and the bottom end is connected to the handheld seat 13, in order to allow the user to hold or grip thereon for operating and using the power tool assembly 10.

The handheld seat 13 mainly includes a structure arranged at one side away from the handle 12 and capable of locking to the battery base 20 in order to allow the battery base 20 to be detachably attached thereto. In addition, the handheld seat 13 includes two lateral protruding walls 16 and a rear protruding wall 17 formed to extend downward from the two side edges and the rear edge respectively, an opening end 18 formed as a notch at a front edge, and an attachment space 14 formed at an inner side of the two lateral protruding walls 16 and the rear protruding wall 17 and fluidly connected to the opening end 18, thereby allowing the battery base 20 to form a locking and buckling structure capable of allowing the battery base 20 to mutually guide, insert and buckle into the opening end 18 end to be integrally attached thereto. In this embodiment, the handheld seat 13 includes a receiving surface 15 arranged at a location adjacent to the front edge opening end 18 and formed to extend inward. A partial area of the receiving surface 15 includes a buckling slot 151 formed to indented inward. The inner side surface of each one of the lateral protruding wall 16 includes a front locking pin 161 and a rear locking pin 162 formed to protrude from locations adjacent to the front side and the rear side respectively, and each one of the front locking pins 161 and each one of the rear locking pins 162 have substantially the same basic pin widths (in the vertical extension direction) and their own pin lengths (in the horizontal extension direction) respectively. Furthermore, each one of the front locking pins 161 and each one of the rear locking pins 162 respectively include a press-fit protruding portion 1611, 1621 formed to protrude from one end adjacent to the rear, and configured in such a way that the pin widths of each one of the front pins 161 and each one of the rear locking pins 162 at one end adjacent to the rear are greater than the basic pin width, which can also be greater than the pin width at one end adjacent to the front. Accordingly, during locking, the front end of a smaller pin width can be used to slide into the locking slot, followed by using the rear end of a greater pin width to form a press-fit locking with the locking slot, thereby achieving the effect of convenient operation and attachment. In addition, each one of the front locking pins 161 and each one of the rear locking pins 162 respectively include an air guiding slot 1612, 1622 formed thereon and fluidly connected to the front end and the rear end in order to prevent air resistance inside the locking slot during the locking attachment.

The battery base 20 has a shape generally identical to that of the handheld seat 13, and it mainly includes a case body 21. The internal of the case body 21 is used to accommodate a battery element capable of storing and supply power. Its external includes a front side portion 22 formed to protrude upward from the front edge, which further extends rearward to form an attachment portion 23 protruded from a central area of the case body 21. The width of the front side portion 22 is slightly greater than the attachment portion 23, and the profiles of the front side portion 22 and the attachment portion 23 generally correspond to the opening end 18 and the attachment space 14 of the handheld seat 13, such that when the battery base 20 is attached to the handheld seat 13, the attachment portion 23 is attached inside the attachment space 14, and the front side portion 22 and the case body 21 are able to cover the opening end 18 and the attachment space 14 respectively.

In addition, the case body 21 includes two lateral protruding edges 211 and one rear protruding edge 212 formed to protrude at the two lateral sides and rear side respectively and arranged opposite from the attachment portion 23, which are formed at locations corresponding to the two lateral protruding walls 16 and the rear protruding wall 17 respectively. When the attachment portion 23 is attached to the attachment space 14, the two lateral protruding walls 16 abut against the two lateral protruding edges 211 and are attached to two lateral sides of the attachment portion 23. The attachment portion 23 is able to provide the sliding direction for the two lateral protruding walls 16 such that the two lateral protruding walls 16 are permitted to slide forward and backward along the attachment portion 23 only. When the two lateral protruding walls 16 move forward to abut the front side portion 22, the rear protruding wall 17 is able to generally abut against the rear edge of the attachment portion 23 at the same time for abutting or positioning at the rear protruding edge 212.

In this embodiment, the battery base 20 includes a pair of front locking slot 231 corresponding to the front locking pin 161 and a rear locking slot 232 corresponding to the rear locking pin 162 formed at two sides of the attachment portion 23 respectively. The front locking slot 231 and the rear locking slot 232 extend in a horizontal direction and configured to allow the corresponding front locking pin 161 and the rear locking pin 162 to be detachably locked thereto for attachment. Furthermore, the front ends of the front locking slot 231 and the rear locking slot 232 are sealed and their rear ends are opened, such that during the locking of the front locking pin 161 and the rear locking pin 162, they can slide into the front locking slot 231 and the rear locking slot 232 from the rear opening in order to achieve the locking and attachment. The slot length (in the horizontal extension direction) of the front locking slot 231 is approximately equivalent to or greater than the pin length of the front locking pin 161, and the slot length (in the horizontal extension direction) of the rear locking slot 232 is approximately equivalent to or greater than the pin length of the rear locking pin 162. When the front locking pin 161 (or the rear locking pin 162) completely slides into the front locking slot 231 (or rear locking slot 232), it is able to use the press-fit protruding portion 1611 (or 1621) to achieve press-fit locking. Furthermore, in this embodiment, the front locking slot 231 and the rear locking slot 232 at the same side of the attachment portion 23 are located on the extension line of the same horizontal direction. Accordingly, the attachment portion 23 further includes a moving slot 233 extending in a vertical direction and formed between the front locking slot 231 and the rear locking lot 232 at the same side, which is provided to allow the front locking pin 161 to move vertically along the direction of the moving slot 233. The upper end of the moving slot 233 includes an opening formed thereon, and its lower end is sealed at the lateral protruding edge 211. In addition, the front side of the lower end is fluidly connected to the opening at the rear end of the front locking slot 231. Accordingly, when the battery base 20 is attached to the handheld seat 13, the user slides the locking pin 161 from the top of the moving slot 233 first and then moves downward to abut the lower end of the moving slot 233. At this time, the lateral protruding wall 16 abuts against the lateral protruding edge 211, such that the lateral protruding wall 16 can be operated easily to slide toward relative to the lateral protruding edge 211, allowing each one of the front locking pins 161 and each one of the rear locking pins 162 to slide into the corresponding front locking slot 231 and the rear locking slot 232 respectively, thereby completing the locking and attachment easily and swiftly.

Furthermore, the top surfaces of the front side portion 22 and the attachment portion 23 include a buckling surface 24 corresponding to the receiving surface 15 formed thereon. When the lateral protruding wall 16 abuts against the lateral protruding edge 211 to slide forward and backward, the receiving surface 15 is able to abut against the buckling surface 24 at the same time and is able to slide forward and backward relative to the buckling surface 24. A partial area of the buckling surface 24 includes two receiving slots 241 formed to indent inward thereon, and the two receiving slots 241 are symmetrical at left and right and arranged corresponding to the location of the buckling slot 151. A guiding slot 221 is formed between the two receiving slots 241, and the guiding slot 221 is formed on the front side portion 22 and extends rearward. Furthermore, the two receiving slots 241 are fluidly connected to the guiding slot 221 respectively. In this embodiment, the guiding slot 221 is formed at the top surface of the attachment portion 23 (i.e., at a partial area of the buckling surface 24). The front opening is fluidly connected to the front side surface, and the slot surface at two sides inside the guiding slot 221 include two guiding protrusions 223, 227 formed thereon respectively, and a leading slot 224 is formed between the two guiding protrusions 223, 227.

Figure 6:
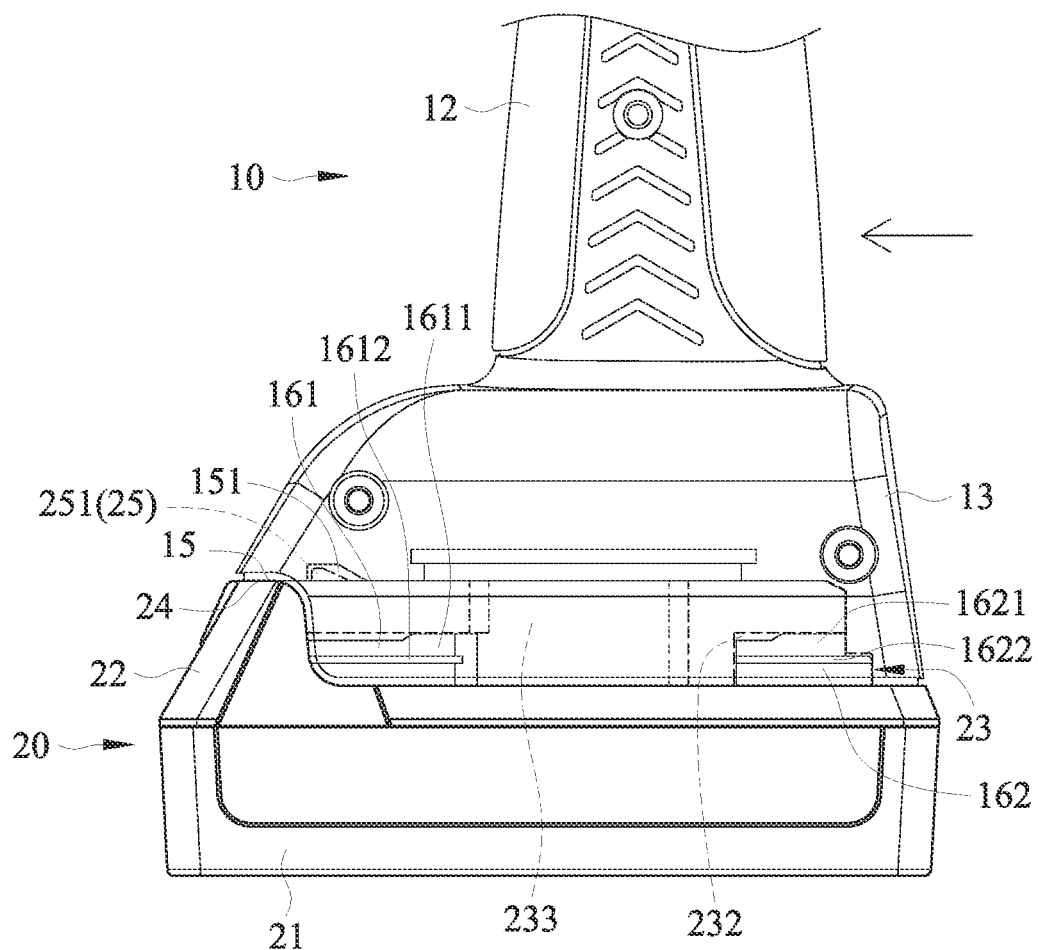
FIG. 6 is a schematic view showing a state after the battery base of the present invention being attached to the handheld seat.
Figure 7:
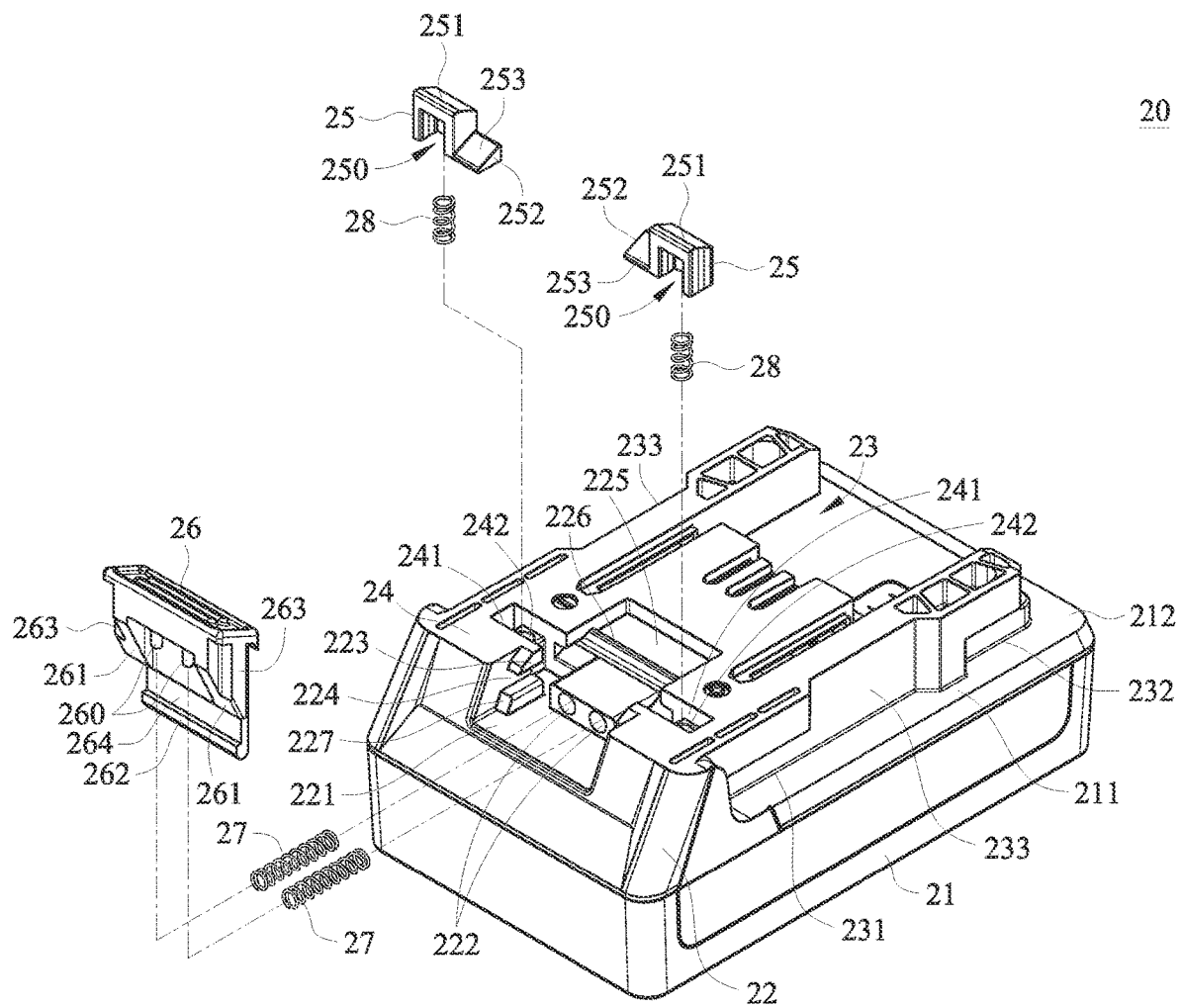
FIG. 7 is an exploded view of the battery base of the present invention.
Figure 8A:
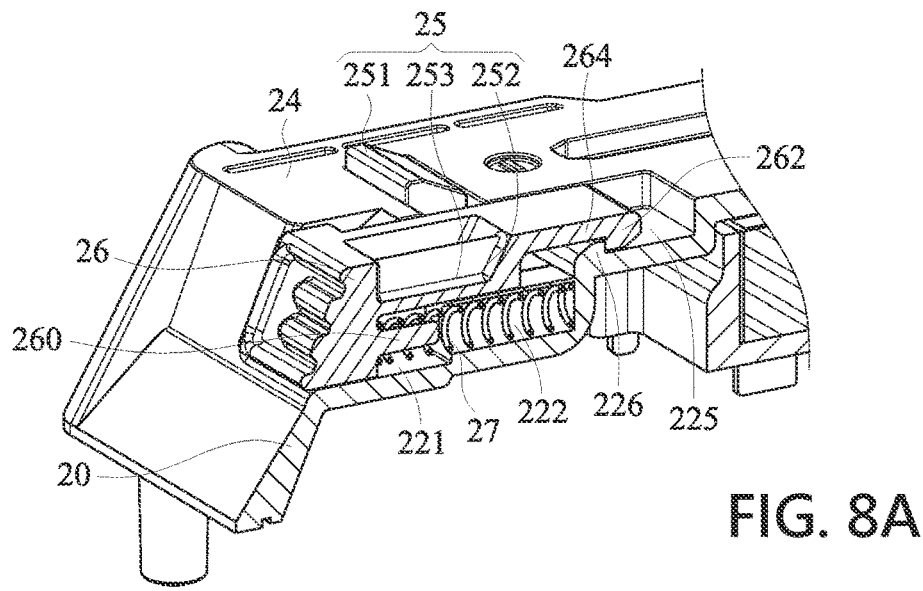
FIGS. 8A, 8B and 8C are cross sectional views of different areas of the battery base of the present invention respectively.
Figure 8B:
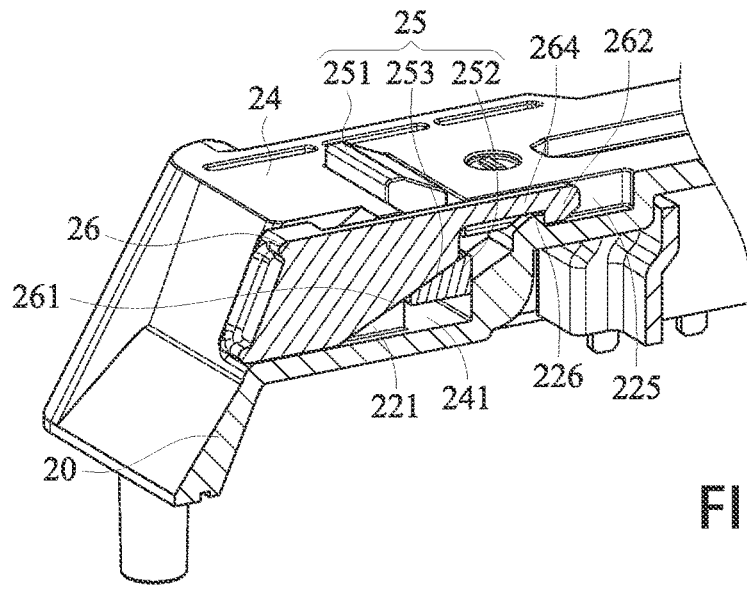
Figure 8C:
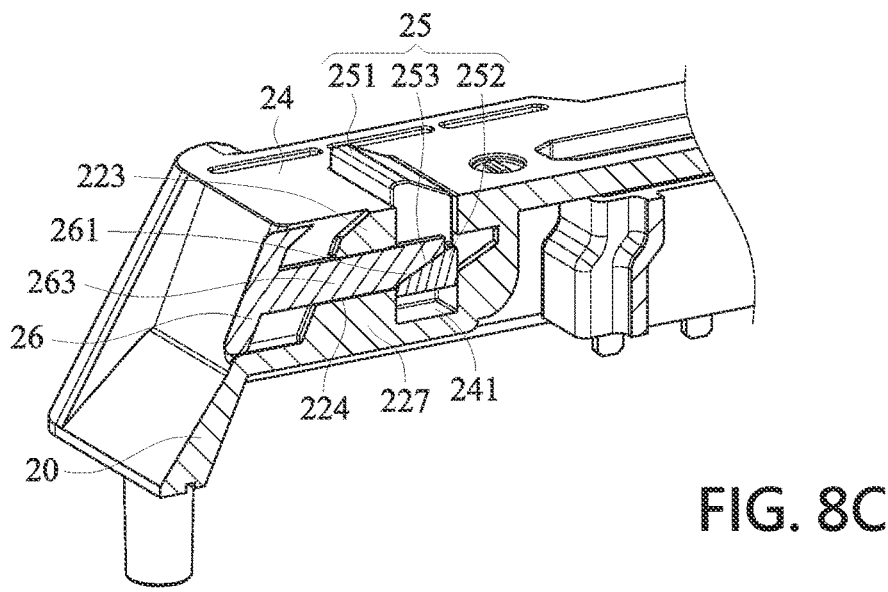
Figure 9A:
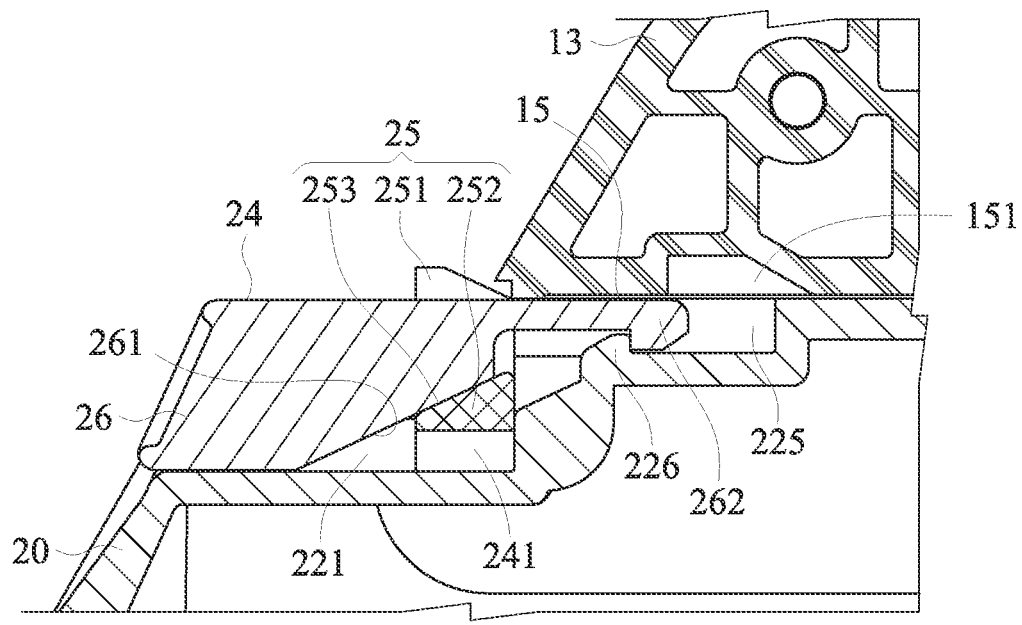
FIG. 9A is a schematic view showing a state before the handheld base abuts against the buckling member during the assembly process of the present invention.
Figure 9B:
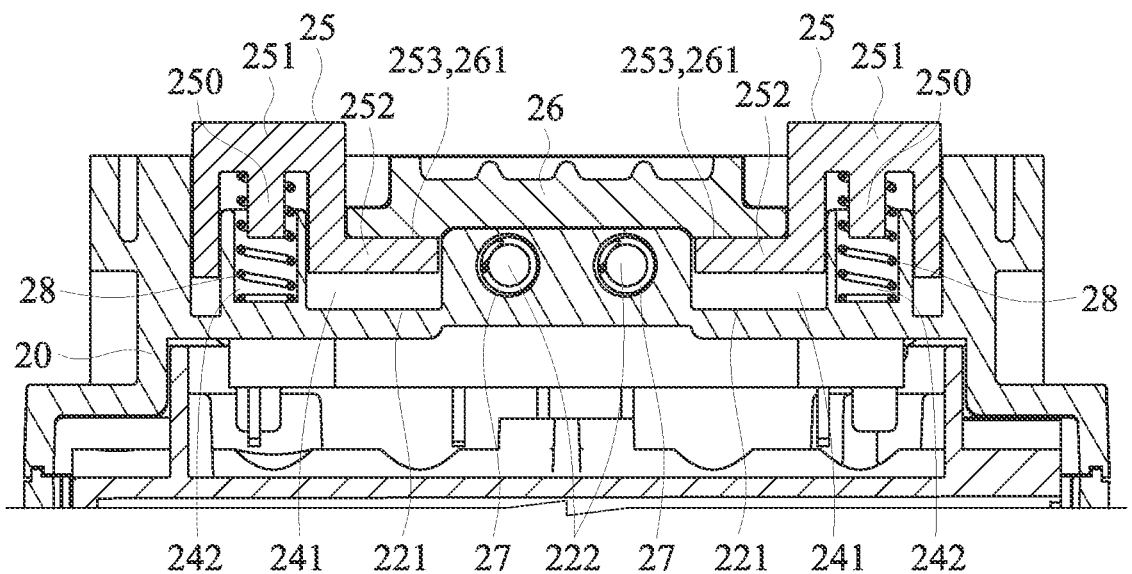
FIG. 9B is a cross sectional view of the buckling member viewed from another angle during the state shown in FIG. 9A.
Figure 10A:
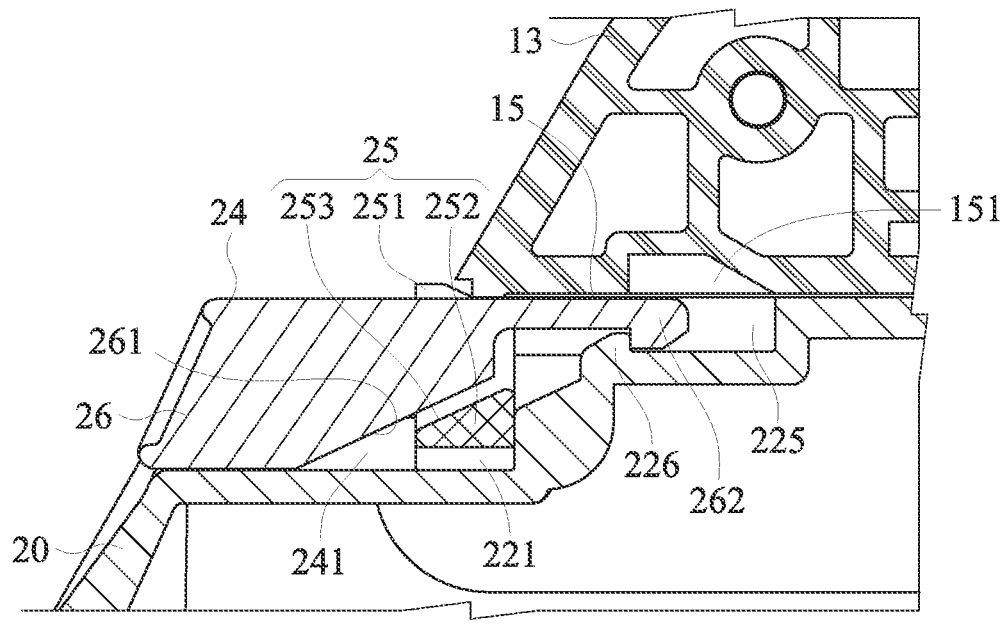
FIG. 10A is a schematic view showing a state when the handheld seat abuts against the buckling member during the assembly process of the present invention.
Figure 10B:
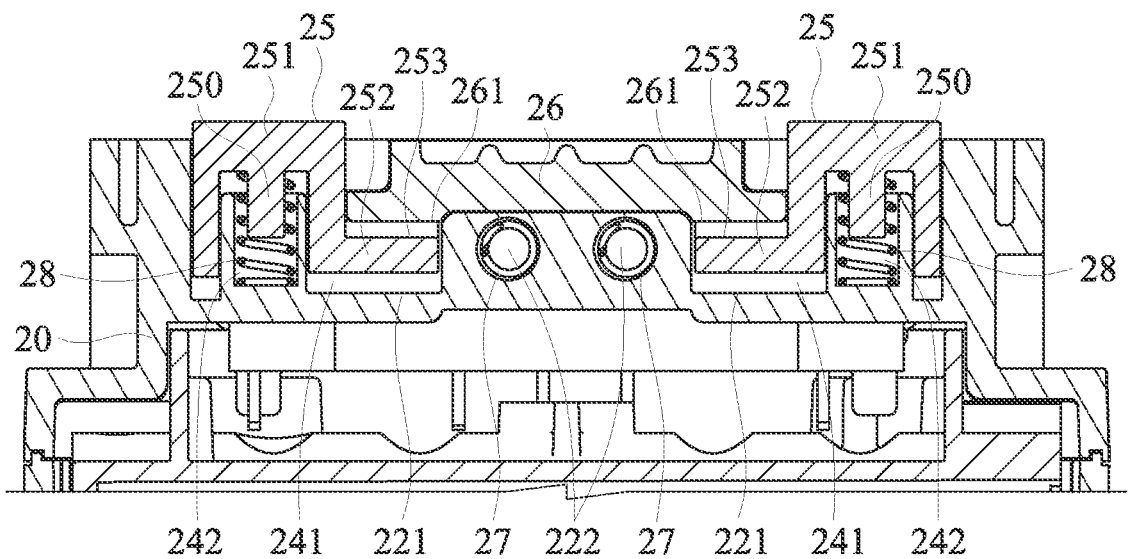
FIG. 10B is a cross sectional view of the buckling member viewed from another angle during the state shown in FIG. 10A.
Figure 11A:
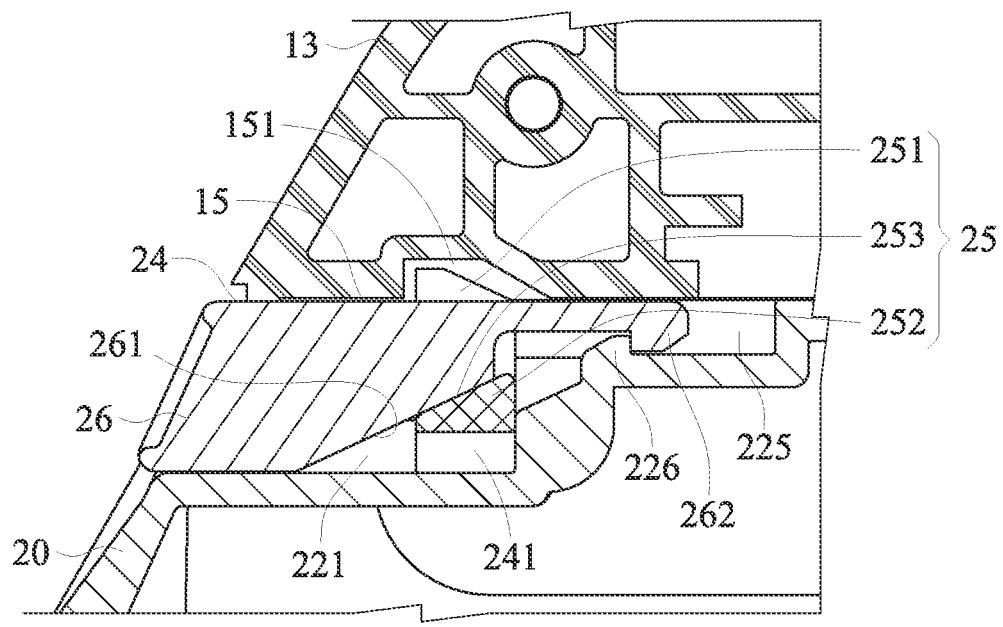
FIG. 11A is a schematic view showing a state when the buckling member is inserted into the buckling slot after assembly completion of the present invention.
Figure 11B:
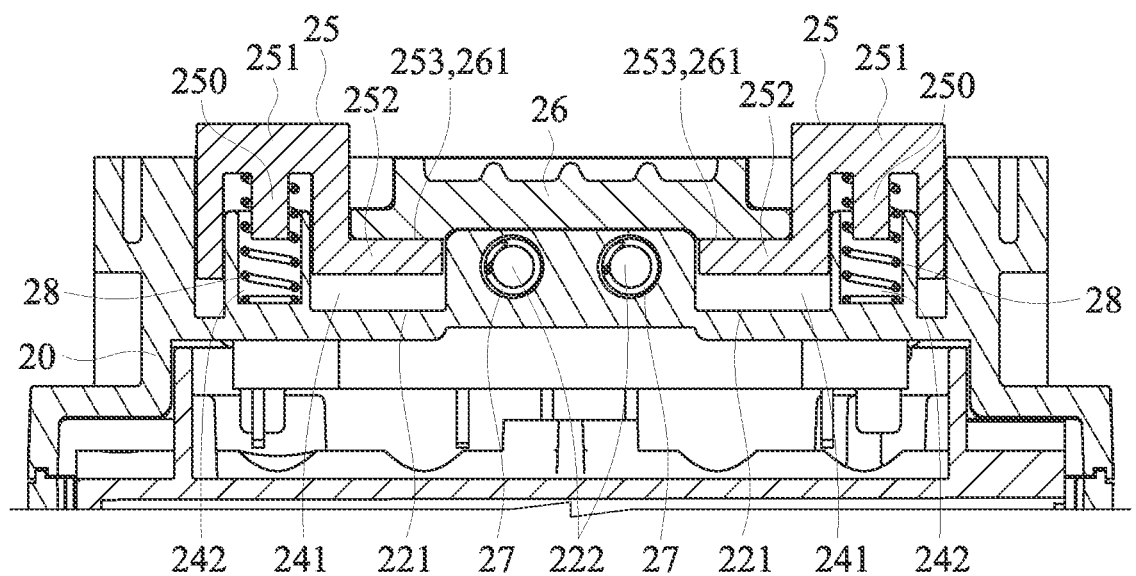
FIG. 11B is a cross sectional view of the buckling member viewed from another angle during the state shown in FIG. 11A.
Figure 12A:
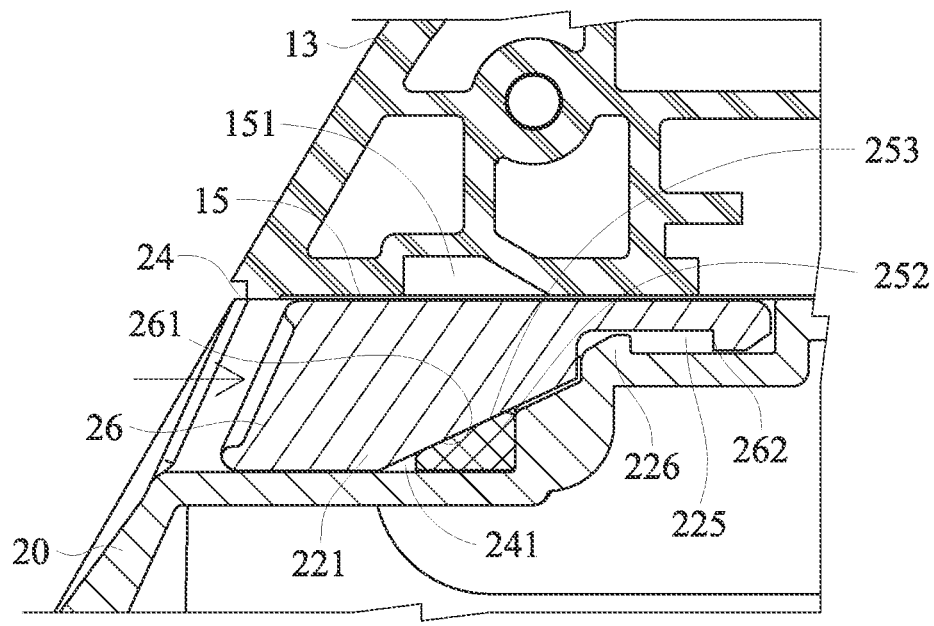
FIG. 12A is a schematic view showing a state when the pressing member drives the buckling member to move during the detachment process of the present invention.
Figure 12B:
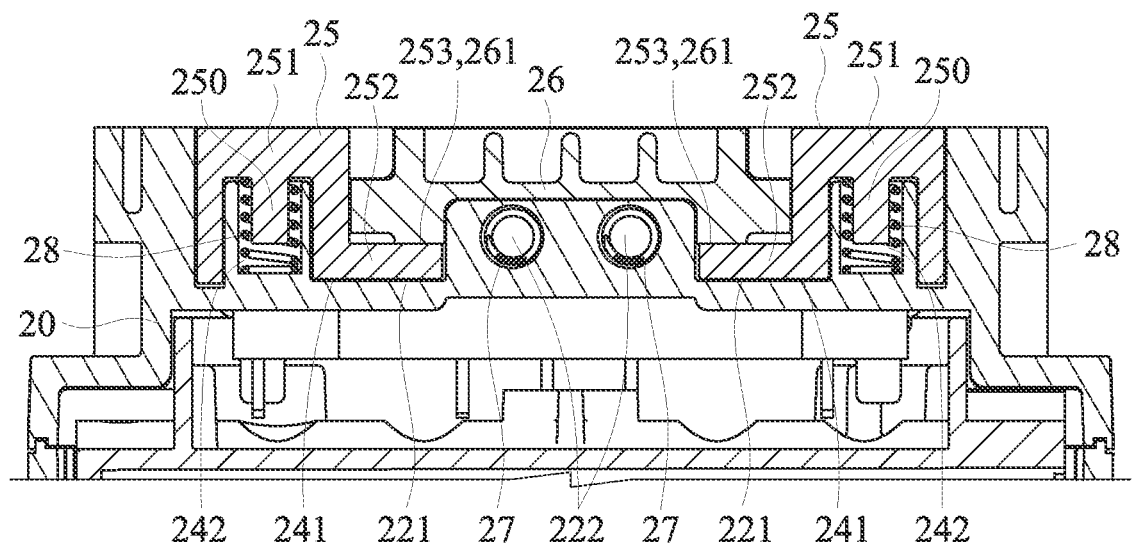
FIG. 12B is a cross sectional view of the buckling member viewed from another angle during the state shown in FIG. 12A.

Please refer to FIG. 7, FIG. 8A-8C. The battery base 20 further comprises two buckling member 25 and a pressing member 26. The two buckling member 25 are disposed inside the two receiving slots 241 respectively, and each one of the buckling members 25 is configured to move vertically between an upper position and a lower position along the direction of each one of the receiving slots 241. In addition, when the buckling member 25 is at the upper position, a protrusion 251 of the buckling member 25 protrudes out of the buckling surface 24 such that during the state (as shown in FIG. 6, FIG. 11A and FIG. 11B) that the battery base 20 is attached to the handheld seat 13, the protrusion 251 is able to reach the internal of the buckling slot 151 of the handheld seat 13 deeply, thereby preventing the battery base 20 to slide forward and backward relative to the handheld seat 13, and it can also cooperate with the front and rear locking pins 161, 162 and the front and rear locking slots 231, 232 locked at two sides of the attachment portion 22, in order to achieve the objective of securing the battery base 20 and the handheld seat 13 at relative positions completely. Moreover, when the buckling member 25 is at the lower position, the protrusion 251 of the buckling member 25 is lower than the buckling surface 24 (as shown in FIG. 12A and FIG. 12B). At this time, the protrusion 251 disengages from the buckling slot 151 in order to release the battery base 20 to slide relative to the handheld seat 13.

The pressing member 26 is disposed inside the guiding slot 221 and is configured to move forward and backward between a front position and a rear position along the direction of the guiding slot 221. In this embodiment, the two lateral sides of the pressing member 26 includes a guiding block 263 formed to protrude therefrom respectively. Each one of the guiding blocks 263 is able to slide inside each one of the leading slots 224 and is configured to limit the sliding direction of the pressing member 26, and each one of the guiding protrusions 223 arranged on the top are used to prevent the pressing member 26 from disengagement from the top. Furthermore, the pressing member 26 includes a slanted pressing surface 261 and configured to push a slanted abutment surface 253 of each one of the buckling members 25 in order to drive the buckling member 25 to move. In addition, the slanted surface with a low front side and a high rear side is used to change the moving direction between the two.

Furthermore, the rear end of the guiding slot 221 includes a limiting slot 225 extending rearward and a horizontal protrusion 226. The pressing member 26 includes an extension plate 264 configured to insert into the limiting slot 225, and the rear end of the extension plate 264 includes a latching portion 262 capable of being retained by the guiding protrusion 223. When the pressing member 26 is at the front position, as shown in FIG. 11A, a latching portion 262 of the pressing member 26 is able to achieve locking together with the horizontal protrusion 222 in order to prevent the pressing member 26 to disengage from the front side. When it is at the front position, the pressing surface 261 blocks the top of the abutment surface 253 in order to prevent the buckling member 25 from disengaging from the receiving slot 241. When the pressing member 26 is at the rear position, as shown in FIG. 12A and FIG. 12B, the pressing member 26 is under state of being pressed to slide toward the rear position. At this time, the pressing surface 261 pushes the abutment surface 253, and through the movement of the slanted surface and under the limitation of each one of the buckling member 25 by each one of the receiving slots 241, each one of the buckling members 25 is driven to move toward the lower position.

In this embodiment, as shown in FIG. 7 to FIG. 12B, each one of the buckling members 25 comprises a protrusion 251 extending upward and a slab 252 extending toward the inner side. The protrusion 251 is disposed at the upper end of the buckling member 25 and is configured to protrude out of buckling surface 24 and to insert into the buckling slot 151 when it is at the upper position in order to achieve locking, and it is also configured to be lower than buckling surface 24 and to disengage from the buckling slot 151 when it is at the lower position. The slab 252 is disposed at the lateral side of the buckling member 25, and each one of the slabs 252 is at the location for inserting into the guiding slot 221. The abutment surface 253 is arranged on the slab 252 and is pushed by the pressing member 26 for movement. Furthermore, the top portion of the protrusion 251 includes a slanted surface having a high front side and a low rear side. In other words, the height of the front edge of the top portion of the protrusion 251 is higher than the height of the rear edge of its top portion. Consequently, it is able to form a one-way retention and buckling, thereby increasing the convenience of assembly and detachment of component parts.

In addition, the guiding slot 221 and the two receiving slots 241 further include two first elastic elements 27 and two second elastic elements 28. The guiding slot 221 includes two first base holes 222 formed at a center of the bottom slot surface. The pressing member 26 includes two first abutting portions 260 formed at the opposition locations. The two first elastic elements 27 use one end for positioning at the two first base holes 222 respectively, and another end for positioning at the two first abutting portion 260, such that the two first elastic elements 27 extend in a horizontal direction and are abutted between the guiding slot 221 and the pressing member 26, in order to provide an elastic acting force to drive the pressing member 26 to slide forward. The two receiving slots 241 include a first base hole 242 formed at an internal thereof respectively. The two buckling members 25 include a second abutting portion 250 formed at opposite locations respectively. Each one of the second elastic members 28 uses one end for positioning at each one of the second base holes 242 respectively, and another end for positioning at each one of the second abutting portions 250, in order to allow each one of the two elastic elements 28 to extend in the vertical direction and to be abutted between each one of the receiving slots 241 and each one of the buckling member 25 respectively, thereby providing an elastic acting force for driving each one of the buckling members 25 to slide upward.

Figure 4:
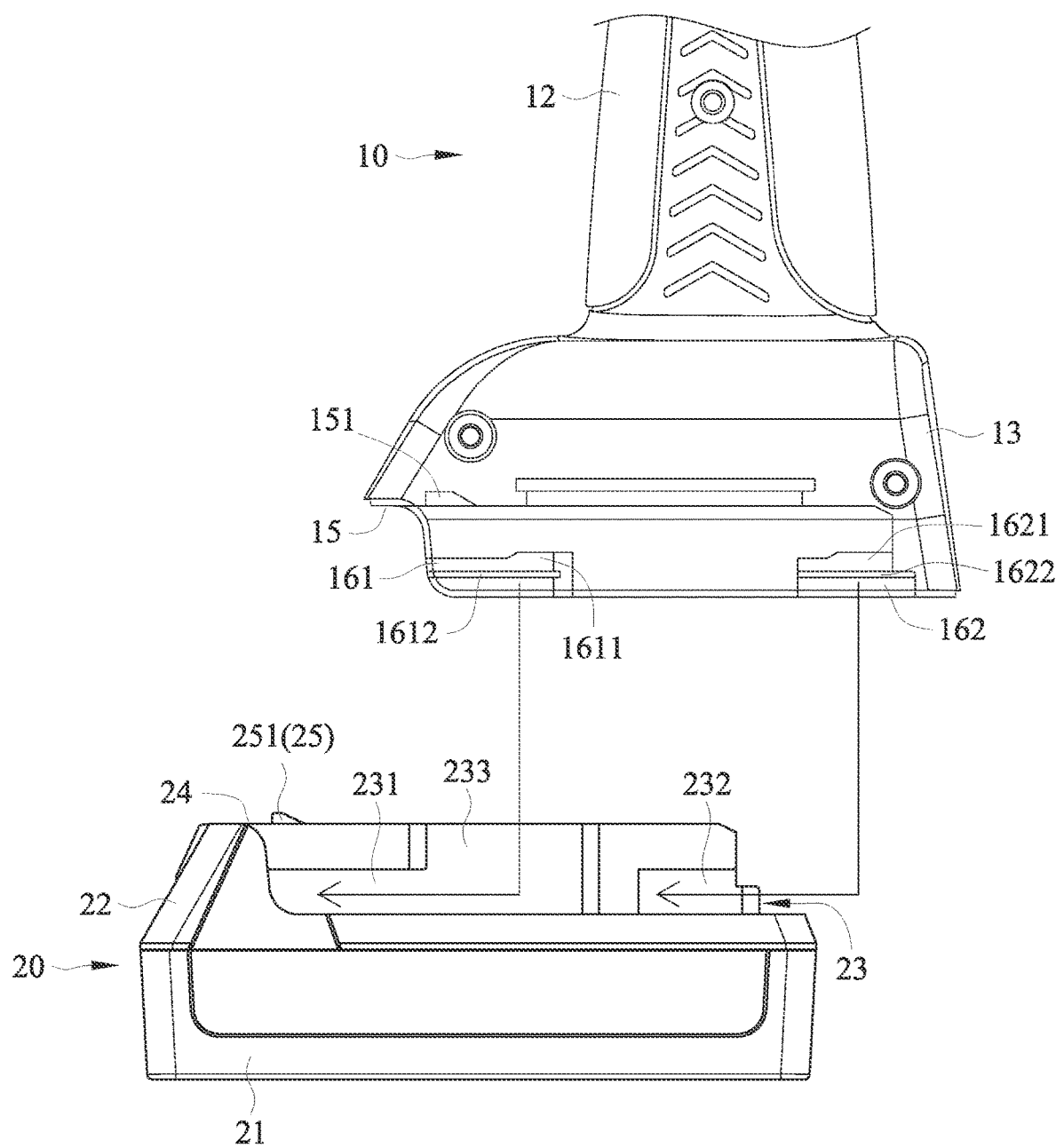
FIG. 4 is a schematic view showing a state before the battery base of the present invention being attached to the handheld seat.
Figure 5:
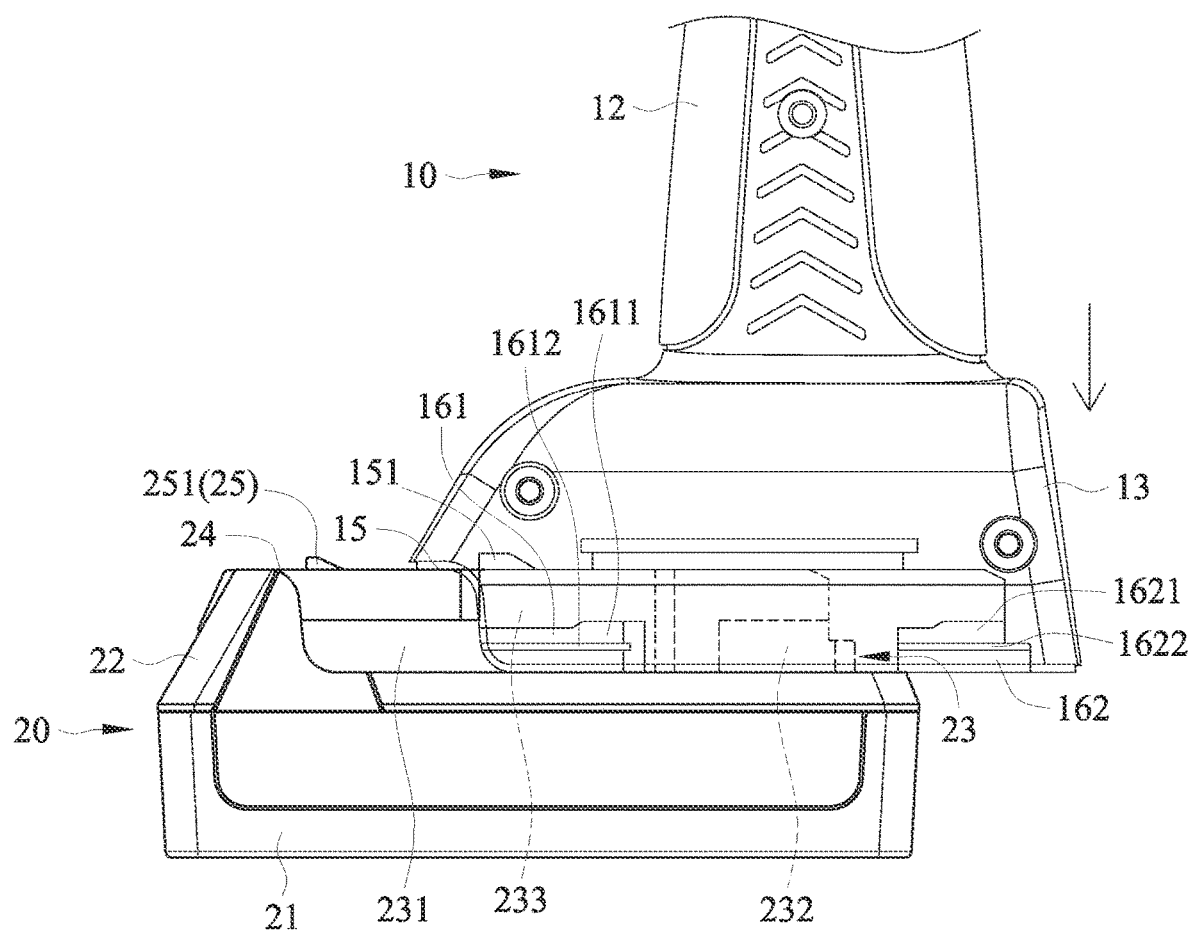
FIG. 5 is a schematic view showing a state during the battery base of the present invention being attached to the handheld seat.

For actual practice, during the assembly of components, as shown in FIG. 3 to FIG. 5, the user can operate the handheld seat 13 to approach the battery base 20 with each other. First, the front locking pin 161 of the handheld base 13 slides in from the location of the moving slot 233, in order to allow the two lateral protruding walls 16 to abut against the two lateral protruding edges 211 of the case body 21. In addition, the receiving surface 15 is able to abut against the top of the buckling surface 24. Next, the user can then easily operate the handheld base 13 to slide forward relative to the battery base 20. During the sliding process, the front ends of the front locking pin 161 and the rear locking pin 162 slide in along the front locking slot 231 and the rear locking slot 232 respectively, as shown in FIG. 9A, FIG. 9B, FIG. 10A and FIG. 10B. The front edge of the handheld seat 13 is able to contact with the rear edge of the protrusion 251 first, and at this time, since the slanted surface of the top portion of the protrusion 251 has a higher front side and a lower rear side, the handheld seat 13 is able to easily push the buckling member 25 (protrusion 251) to move downward during the sliding process. When it slides to reach the location of the buckling slot 151 corresponding to the buckling member 25, as shown in FIG. 11A and FIG. 11B, the buckling member 25 is ejected upward due to the elastic acting force, allowing the protrusion 251 to be inserted into the buckling slot 151 to achieve locking. In addition, the front locking pin 161 and the rear locking pin 162 at the two sides are able to slide into the front locking lost 231 and the rear locking slot 232 at the same time completely (as shown in FIG. 6). Furthermore, through their respective press-fit protrusions 1611, 1622, they are able to achieve press-fit with the front locking slot 231 and the rear locking slot 232 respectively. Consequently, at this time, the assembly operation of the handheld seat 13 and the battery base 20 is complete, and the operation process is extremely easy and convenient. To detach and disengage the component parts, as shown in FIG. 12A and FIG. 12B, the user can press the pressing member 26 to allow the pressing member 26 to slide toward the rear position and to drive the buckling member 25 to slide downward. After the protrusion 251 of the buckling member 25 disengages from buckling slot 151, the user is able to easily push the handheld seat 13 to slide rearward relative to the battery case 20, thereby allowing the front locking pin 161 and the rear locking slot 162 at the two sides to disengage from the front locking slot 231 and the rear locking slot 232 simultaneously. Finally, the front locking pin 161 slides upward to disengage from the moving slot 233, and the detachment operation is complete.

With the aforementioned assembly structure and attachment structure, the present invention allows the user to operate the device easily and conveniently. In addition, through the use of the locking slots and locking pins distributed at four corners, stress can be effectively distributed to achieve a stable and rigid structure, such that the present invention is able to withstand impact and to have an improved durability.

In view of the above, the improvement of the present invention is able to significantly increase the convenience of the assembly and application of the power tool assembly 10 and the battery base 20. The present invention is of novelty and inventive step such that patent application is submitted according to the laws. However, it can be understood that the above description is provided to illustrate the preferred embodiments of the present invention only, such that any change, modification, alternation or equivalent replacement made based on the technical means and scope of the present invention shall be considered to be within the scope of the claim of the present invention.

What is claimed is:

1. A buckling structure for a battery of a handheld power tool, comprising:
    a handheld seat (13) connected with a power tool (11) and having
        a horizontal opening end (18); and
        a receiving surface (15) formed at an inner side of the opening end (18) and having a buckling slot (151) formed thereon;
        two front locking pins (161) respectively formed on two lateral protruding walls (16) which are respectively protruding downwardly from two lateral sides of the receiving surface (15); and
    a battery base (20) detachably attached to the handheld seat (13) and having
        a buckling surface (24) corresponding to the receiving surface (15) and configured to move forward and backward relative to the receiving surface (15);
        two front locking slots (231) formed on two side surfaces of the battery base (20) respectively; each of the front locking slots (231) extending in a horizontal direction and configured to allow a corresponding front locking pin (161) to be detachably attached thereto; each of the front locking slots (231) having a rear end connected with a moving slot (233), and the moving slot (233) extending in a vertical direction and forming an opening of the buckling surface (24);
        a guiding slot (221) formed at a front surface of the battery base (20) and extending horizontally inside the battery base (20);
        two receiving slots (241) formed at the buckling surface (24) and extending vertically inside the battery base (20), the two receiving slots (241) being disposed at two sides of the guiding slot (221) respectively and fluidly connected to the guiding slot (221);
        two buckling members (25) disposed inside the two receiving slots (241) respectively and configured to move vertically between an upper position and a lower position along the two receiving slots (241); and
        a pressing member (26) disposed inside the guiding slot (221) and configured to move between a front position and a rear position along the guiding slot (221);
    wherein
    the handheld seat (13) further has
        two rear locking pins (162) respectively formed on the two lateral protruding walls (16), located in back of and spaced apart from the two front locking pins (161); and
    the battery base (20) further has
        two rear locking slots (232) respectively formed on the two side surfaces of the battery base (20), located in back of and spaced apart from the two front locking slots (231); each of the rear locking slots (232) extending in a horizontal direction and configured to allow a corresponding rear locking pin (162) to be detachably attached thereto;
        two stopping walls respectively formed on the two side surfaces of the battery base (20); each of the two stopping walls disposed between a corresponding one of the front locking slots (231) and a corresponding one of the rear locking slots (232), separating the corresponding front locking slot (231) and the corresponding rear locking slot (232), and located in back of the rear end of the front locking slot (231); the moving slots (233) respectively extending along the two stopping walls;
        at least one guiding protrusion (223) and a leading slot (224) formed at a side slot surface of the guiding slot (221), and the pressing member (26) having a guiding block (263) corresponding to the leading slot (224), so that the guiding block (263) is able to slide inside the leading slots (224) to limit a sliding direction of the pressing member (26);
        a first elastic element (27) extending in a horizontal direction and abutted between the guiding slot (221) and the pressing member (26) in order to provide a forward elastic acting force to drive the pressing member (26) to slide forward;
        a limiting slot (225) extending rearward of a rear end of the guiding slot (221), and the pressing member (26) having an extension plate (264) configured to insert into the limiting slot (225);
        a horizontal protrusion (226) formed at an end of the guiding slot (221), and the extension plate (264) forming a latching portion (262) capable of being retained by the at least one guiding protrusion (223) in order to prevent the pressing member 26 from disengaging with the guiding slot (221); and
        two second elastic elements (28) extending in a vertical direction and abutted between each one of the receiving slots (241) and a corresponding one of the buckling members (25) respectively in order to provide an upward elastic acting force to drive each one of the buckling members (25) to slide upward;
    when the battery base (20) is buckled to the handheld seat (13), a buckling member (25) is at the upper position and capable of being inserted into the buckling slot (151) of the receiving surface (15) in order to restrict the battery base (20) from moving relative to the handheld seat (13); and
    when the buckling member (25) is at the lower position, the buckling member (25) is disengaged from the buckling slot (151), thereby allowing the battery base (20) to move relative to the handheld seat (13); and
    wherein each one of the buckling members (25) has a slab (252) extending from one side thereof and configured to insert into the guiding slot (221), each one of the slabs (252) having a slanted abutment surface (253), and the pressing member (26) having at least one slanted pressing surface (261) corresponding to the abutment surfaces (253) and being configured to push the abutment surfaces (253) in order to drive the buckling members (25) to move; and when the pressing member (26) is moved toward the rear position, the pressing surface (261) pushes against the abutment surface (253) in order to drive the buckling member (25) to move toward the lower position.

2. The buckling structure according to claim 1, wherein each one of the buckling members (25) further comprises a protrusion (251) configured to protrude out of the buckling surface (24) when the buckling member (25) is at the upper position or to insert into the buckling slot (151) during buckling and attachment.

3. The buckling structure according to claim 2, wherein a front side height of the protrusion (251) is higher than a rear side height thereof.

4. The buckling structure according to claim 1, wherein the abutment surface (253) is a slanted surface having a lower front side and a higher rear side.

5. The buckling structure according to claim 2, wherein the abutment surface (253) is a slanted surface having a lower front side and a higher rear side.

6. The buckling structure according to claim 3, wherein the abutment surface (253) is a slanted surface having a lower front side and a higher rear side.

7. The buckling structure according to claim 4, wherein the pressing surface (261) is parallel with the abutment surface (253).

8. The buckling structure according to claim 5, wherein the pressing surface (261) is parallel with the abutment surface (253).

9. The buckling structure according to claim 6, wherein the pressing surface (261) is parallel with the abutment surface (253).

* * * * *